United States Patent [19]
Mine et al.

[11] 3,846,441
[45] Nov. 5, 1974

[54] 1,5-DISUBSTITUTED-3-SUBSTITUTED PHENYL HYDANTOINS

[75] Inventors: Akihiko Mine, Toyonaka; Akira Fujinami, Ashiya; Nobuyuki Kameda, Takarazuka; Naganori Hino, Toyonaka; Takeo Satomi, Takarazuka; Kohshi Tateishi, Minoo, all of Japan

[73] Assignee: Sumitomo Chemical Company, Limited, Osaka, Japan

[22] Filed: Nov. 29, 1971

[21] Appl. No.: 203,003

[30] Foreign Application Priority Data
Dec. 9, 1970   Japan.............................. 45-109772

[52] U.S. Cl................................ 260/309.5, 71/92
[51] Int. Cl............................................ C07d 49/32
[58] Field of Search................................ 260/309.5

[56] References Cited
UNITED STATES PATENTS

| | | | |
|---|---|---|---|
| 3,134,663 | 5/1964 | Kroll................................ | 260/309.5 |
| 3,452,040 | 6/1969 | Langio............................. | 260/309.5 |
| 3,452,041 | 6/1969 | Bell et al........................... | 260/309.5 |
| 3,668,217 | 6/1972 | Fujinami et al................... | 260/309.5 |
| 3,676,456 | 7/1972 | Gruenfeld........................ | 260/309.5 |

FOREIGN PATENTS OR APPLICATIONS

| | | | |
|---|---|---|---|
| 1,039,302 | 3/1959 | Germany......................... | 260/309.5 |
| 629,779 | 10/1963 | Belgium........................... | 260/309.5 |

OTHER PUBLICATIONS

Shirai et al., Chem. Pharm. Bull., Vol. 17, pages 2436–2441, (1969), RS1.C4.
Holmberg, Chem. Abst., Vol. 46, column 8651, (1952), QD1.A51.
Johnson et al., J. Amer. Chem. Soc., Vol. 36, pages 1735–174, (1914), QD1.A5.
Seth et al., Bull. Soc. Chim. Belges., Vol. 75, pages 529 & 532–538, (1966), QD1.S39.
Nematollahi et al., Chem. Abst., Vol. 59, column 12786, (1963), QD1.A51.
Simonian et al., Chem. Abst., Vol. 56, column 12906, (1962), QD1.A51.
Deck et al., J. Amer. Chem. Soc., Vol. 55, pages 4986–4991, (1933), QD1.A5.
Gruenfeld Chem. Abst., Vol. 72, No. 12723 (1970, 1–19–70), QD1.A51.
General Electric Co., Vol. 62, columns 16257–16259, (1965), QD1.451. (Abstract Netherlands Application 6,405,703).
Ben-Ishai et al., J. Heterocycl. Chem., Vol. 7, pages 1289–1293, (1970, Dec. 1970), QD400.J6.
Lombardino et al., J. Med. Chem., Vol. 7, pages 97–101, (1964), RS1.J5.

*Primary Examiner*—Natalie Trousof
*Attorney, Agent, or Firm*—Stevens, Davis, Miller & Mosher

[57] ABSTRACT

A hydantoin derivative having the formula,

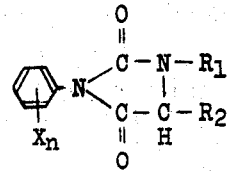

wherein X is hydrogen atom, a halogen atom, nitro, lower alkyl, lower alkoxy, cyano, trifluoromethyl or lower alkoxycarbonyl, $R_1$ and $R_2$ are alkyl having 1 to 6 carbon atoms, lower alkenyl, cyclohexyl, phenyl or benzyl, and n is an integer of 1 to 3, which may be useful as herbicides.

4 Claims, No Drawings

1,5-DISUBSTITUTED-3-SUBSTITUTED PHENYL HYDANTOINS

This invention relates to a new herbicidal composition containing a hydantoin derivative as the active ingredient, and to a process for preparing said hydantoin derivative.

More particularly, the invention pertains to a hydantoin derivative having the formula (I),

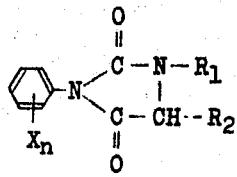
(I)

wherein X is a hydrogen or halogen atom, or a nitro, lower alkyl, lower alkoxy, cyano, trifluoromethyl or lower alkoxycarbonyl group; $R_1$ $R_2$ are individually an alkyl group having 1 to 6 carbon atoms, or a lower alkenyl, cyclohexyl, phenyl or benzyl group; and $n$ is an integer of 1 to 3; and processes for preparation and herbicidal composition of the same.

In the compounds represented by the aforesaid formula (I), examples of the term "halogen" include fluorine, chlorine, bromine and iodine atoms. The term "lower alkyl" signifies methyl, ethyl, propyl, isopropyl, butyl, isobutyl or tertiarybutyl; and the term "lower alkoxy" signifies methoxy, ethoxy, propoxy, isopropoxy, butoxy, isobutoxy or tertiary butoxy. Examples of the term "lower alkoxycarbonyl" show methoxycarbonyl, ethoxycarbonyl groups and the like, and examples of lower alkenyl show vinyl, allyl groups and the like.

Among the compounds represented by the formula (I), a hydantoin derivative, wherein X is a hydrogen or halogen atom, or a nitro, lower alkyl, lower alkoxy, cyano, trifluoromethyl or lower alkoxycarbonyl group; $R_1$ and $R_2$ are individually an alkyl group having 1 to 6 carbon atoms, or a lower alkenyl, cyclohexyl, phenyl or benzyl group; and $n$ is an integer of 1 to 3, provided that X is other substituent than hydrogen atom when both $R_1$ and $R_2$ are methyl groups; is a novel compound.

According to the present invention, the novel hydantoin derivatives represented by the formula (I) may be prepared by the following processes.

One process for preparing a novel hydantoin derivative having the formula (I) which comprises reacting a phenyl isocyanate having the formula (II),

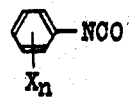
(II)

wherein X and $n$ are as defined above, with an amine having the formula (III),

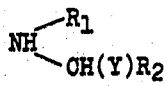
(III)

wherein $R_1$ and $R_2$ are as defined above; and Y is a cyano, carboxyl or lower alkoxycarbonyl group, and then heating the resulting urea derivative in the presence of a diluted inorganic acid; another process for preparing a novel hydantoin derivative having the formula (I) which comprises reacting, in the presence of a suitable dehydrochlorinating agent, an aniline having the formula (IV),

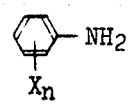
(IV)

wherein X and $n$ are as defined above, with a carbamoyl chloride having the formula (V),

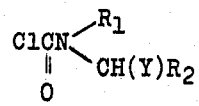
(V)

wherein $R_1$, $R_2$ and Y are as defined above, and then heating the resulting urea derivative in the presence of a diluted inorganic acid.

As the result of extensive studies on herbicides having strong herbicidal activities, the present inventor have found that among the 3-phenylhydantoin derivatives, those which have such a structure that the 1- and 5-positions have simultaneously been substituted by the aforesaid groups have strong herbicidal activities.

Accordingly, an object of the present invention is to provide novel and useful hydantoins which have excellent herbicidal properties. Another object is to provide processes for producing such novel and useful hydantoins. A further object is to provide herbicidal composition containing such novel and useful hydantoins. Other object and merits of the present inventions will be apparent from the following descriptions.

Many studies on the physiological activities of 3-phenylhydantoin derivatives have heretofore been made particularly in the medical field, and several reports concerning the physiological activities of said derivatives are also seen in the agricultural field. However, there is no report concerning the physiological activities of 1,5-disubstituted 3-phenylhydantoin derivatives, which are the compounds of the present invention, and thus the finding that said compounds have specifically strong herbicidal activities is a surprising novel knowledge which can never be expected from the conventional knowledge. Among the 1,5-disubstituted-3-phenylhydantoin derivatives, there has been known 1,5-dimethyl-3phenylhydantoin (French Pat. No. 1,389,841). However, no knowledge concerning the physiological activities of said compound has ever been attained at all.

As herbicides, the present compounds have such characteristics that they display excellent herbicidal activities when applied to weeds both before and after germination, and have strong selective herbicidal effects on a wide scope of weeds, e.g. grass family weeds such as barnyard grass (*Panicum crus-galli*), crabgrass (*Digitaria sanguinalis*), foxtail (*Alopecurus aequalis*), etc.; broad leaved weeds such as milk pruslane (*Euphorbia supina*), polygonum sp. (*Polygonum longistem*), common pruslane (*Portulaca oleracea*), false pimpernel (*Linderna pyxidaria* L.), common lambsquarter (*Chenopodium album*), pigweed sp. (*Amaranthus retroflexus*), monochoria (*Monochoria vaginalis* Presl.), etc.; and nutsedge (*Cyperus spp.*), etc. without any substantial phytotoxicity on many such crops as soybean, wheat, corn, burdock, etc.

The herbicidal characteristics of the present compounds are derived chiefly from their inhibiting actions on photosynthesis, though the compounds inhibit as well the germination of weeds when applied in large amounts. The said actions have not been observed in other 3-phenylhydantoin derivatives, and it is considered that the 1,5-disubstituted compounds of the present invention play an important role to bring about said actions.

In practice, the present compounds are applied in a proportion of 2 to 200 g/are to the fields of various cereals including aquatic rice, beans, vegetables, etc., orchards, turfs, nursery tree fields, pasture lands, noncultivated lands, etc., whereby weeds in such fields can be controlled.

In order to accomplish these objects the present invention provides novel 1,5-disubstituted hydantoins. According to the present invention, the novel hydantoins represented by the formula (I) may be prepared by a variety of methods. One method of the present invention is carried out, in general, in the following manner:

One mole of an isocyanate having the formula (II) is reacted with one mole of an amine having the formula (III), if necessary, at an elevated temperature, in the absence of solvent or in the presence of a suitable solvent such as, benzene, toluene, xylene, ligroin hexane, isopropyl ether, ethyl ether, ethyl acetate, chloroform, carbon tetrachloride, tetrahydrofuran, chlorobenzene or water, preferably toluene, whereby a urea derivative is formed as an intermediate. An aqueous solution of an inorganic acid such as hydrochloric, sulfuric, phosphoric or nitric acid, preferably hydrochloric acid is added to the reaction mixture to be subjected to vigorous stirring for several hours, if necessary, at elevated temperature. During this time, the intermediate urea derivative is cyclized to a hydantoin derivative. After completion of the reaction, the reaction liquid is cooled, and deposited crystals are collected to obtain a pure end product in a high yield. Recrystallization from methanol or ethanol gives a higher purity end product.

Another method of the present invention (3) is carried out, in general, in the following manner:

One mole of an aniline having the formula (IV) and one mole of a suitable dehydrochlorinating agent such as pyridine, triethylamine, N,N-dimethylaniline, N,N-diethylaniline, n-methylmorpholine, potassium carbonate or sodium carbonate, preferably pyridine, are dissolved in 150 ml. of a suitable solvent such as benzene, toluene, xylene, petroleum benzine, ligroin, hexane, ethyl ether, ethyl acetate, isopropyl ether, chloroform, carbon tetrachloride, tetrahydrofuran, chlorobenzene or water, preferably toluene. One mole of a carbamoyl chloride having the formula (V) is gradually added to the resulting solution with stirring, if necessary, at an elevated temperature. An aqueous solution of an inorganic acid such as hydrochloric, sulfuric, phosphoric or nitric acid, preferably hydrochloric acid is added to the reaction mixture and then vigorously stirred for several hours, if necessary, at an elevated temperature. During this time, the intermediate urea derivative is cyclized to a desired hydatoin derivative. After completion of the reaction, the reaction mixture is cooled, and the precipitate is collected by filtration, washed with water and then dried to obtain the desired hydantoin derivative at a high purity and in a high yield. Recrystallization from methanol or ethanol gives a highly pure end product.

Some of the representative compounds synthesized according to the above-mentioned processes are shown below, but the compounds of the invention are not limited only to these.

| No. | Compound | m.p. (°C.) |
|---|---|---|
| 1 | (phenyl)-N,N-dimethyl hydantoin | 144.5 – 146 |
| 2 | (3-Cl-phenyl)-N,N-dimethyl hydantoin | 103.5 – 105.5 |
| 3 | (2-Cl-phenyl)-N,N-dimethyl hydantoin | 78.0 – 80.0 |
| 4 | (4-Cl-phenyl)-N,N-dimethyl hydantoin | 148.0 – 149.5 |
| 5 | (2-CH$_3$-phenyl)-N,N-dimethyl hydantoin | 130.5 – 132.5 |
| 6 | (4-CH$_3$-phenyl)-N,N-dimethyl hydantoin | 83.0 – 84.5 |
| 7 | (3-CF$_3$-4-CH$_3$O-phenyl)-N,N-dimethyl hydantoin | 102.0 – 105.0 |

| # | Structure | mp (°C) | | # | Structure | mp (°C) |
|---|---|---|---|---|---|---|
| 8 | 3-CH₃-C₆H₄ imidazolidine-2,5-dione N-CH₃, CH₃ | 114.0 – 116.0 | | 16 | C₂H₅OC(O)-C₆H₄ imidazolidine-2,5-dione N-CH₃, CH₃ | 125.5 – 127.0 |
| 9 | 3,4-Cl₂-C₆H₃ imidazolidine-2,5-dione N-CH₃, CH₃ | 160.5 – 162.5 | | 17 | 2,5-Cl₂-C₆H₃ imidazolidine-2,5-dione N-CH₃, CH₃ | 194.5 – 196.5 |
| 10 | 3-F-C₆H₄ imidazolidine-2,5-dione N-CH₃, CH₃ | 119.0 – 120.5 | | 18 | 2,4,6-(CH₃)₃-C₆H₂ imidazolidine-2,5-dione N-CH₃, CH₃ | 104.0 – 106.0 |
| 11 | 4-Br-C₆H₄ imidazolidine-2,5-dione N-CH₃, CH₃ | 164.5 – 166.0 | | 19 | 3-Cl-C₆H₄ imidazolidine-2,5-dione N-CH₃, C₂H₅ | 110.5 – 113.0 |
| 12 | 4-CH₃O-C₆H₄ imidazolidine-2,5-dione N-CH₃, CH₃ | 146.5 – 147.5 | | 20 | 4-Cl-C₆H₄ imidazolidine-2,5-dione N-CH₃, C₂H₅ | 114.5 – 116.0 |
| 13 | 3-CF₃-C₆H₄ imidazolidine-2,5-dione N-CH₃, CH₃ | 122.0 – 123.5 | | 21 | 3,5-Cl₂-C₆H₃ imidazolidine-2,5-dione N-CH₃, C₂H₅ | 69.5 – 72.5 |
| 14 | 4-NO₂-C₆H₄ imidazolidine-2,5-dione N-CH₃, CH₃ | 158.5 – 160.5 | | 22 | C₆H₅ imidazolidine-2,5-dione N-C₂H₅, CH₃ | 72.0 – 73.0 |
| 15 | 2,4-(CH₃)₂-C₆H₃ imidazolidine-2,5-dione N-CH₃, CH₃ | 103.0 – 105.0 | | 23 | 3-Cl-C₆H₄ imidazolidine-2,5-dione N-C₂H₅, CH₃ | 77.0 – 78.5 |

| # | structure | m.p. | # | structure | m.p. |
|---|---|---|---|---|---|
| 24 | 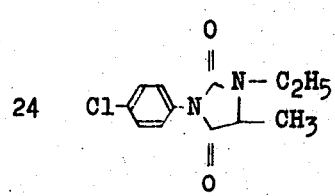 | 97.5 – 99.5 | 32 | 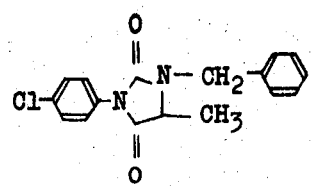 | 122.0 – 124.0 |
| 25 | 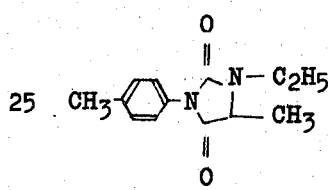 | 66.0 – 68.0 | 33 | 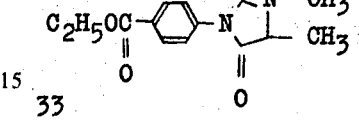 | 125.5 – 127.0 |
| 26 | 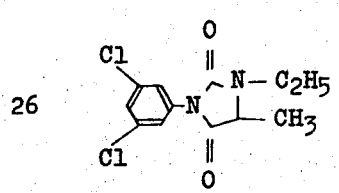 | 101.0 – 102.5 | 34 | 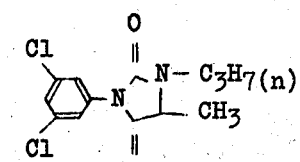 | 65.5 – 68.0 |
| 27 | 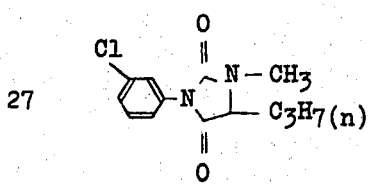 | 122.0 – 123.0 | 35 | 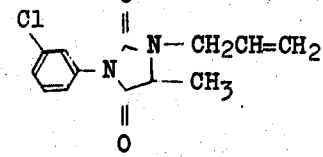 | 58.0 – 60.0 |
| 28 | 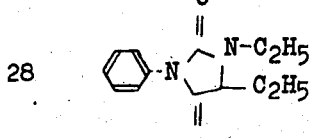 | 55.0 – 56.5 | 36 | 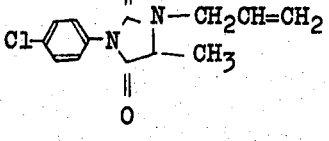 | 99.0 – 100.5 |
| 29 | 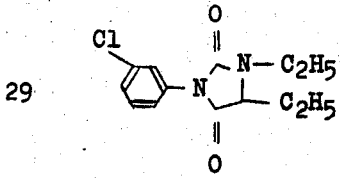 | 79.0 – 80.5 | 37 | 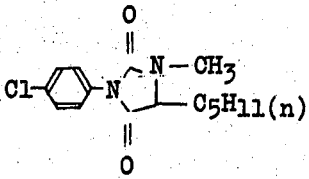 | 104.0 – 105.5 |
| 30 | 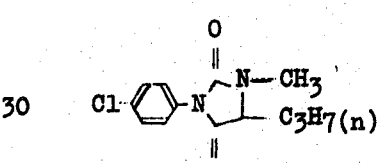 | 136.0 – 137.0 | 38 | 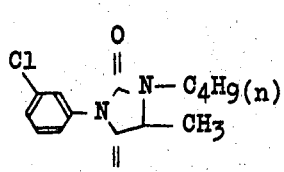 | 48.5 – 50.0 |
| 31 | 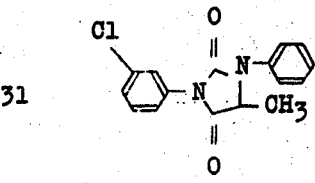 | 109.5 – 111.5 | 39 | 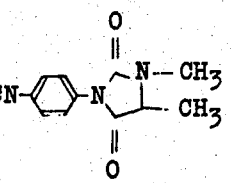 | |

| | | |
|---|---|---|
| 40 | 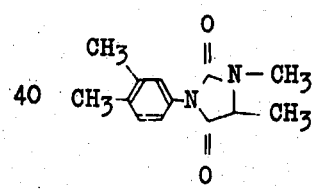 | 136.0 – 137.0 |
| 41 | 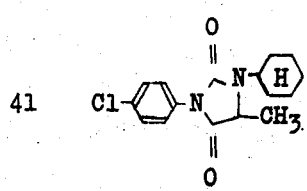 | 94.5 – 96.5 |
| 42 | 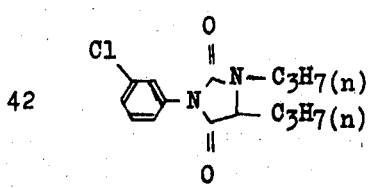 | 49.0 – 50.0 |

In actual application, the present compounds may be formulated into any of such preparations as dusts, granules, wettable powders and emulsifiable concentrates. In formulating these preparations, there may be used solid carriers such as, for example, talc, bentonite, clay, kaolin, diatomaceous earth, vermiculite, slaked lime, etc.; liquid carriers such as, for example, benzene, alcohols, acetone, xylene, methyl naphthalene, dioxane, cyclohexanone, etc.; and emulsifers such as, for example, alkylsulfonic acid esters, alkylsulfonic acid salts, polyethylene glycol ethers, polyhydric alcohol esters, etc.

In practice, the herbicidal compositions thus prepared may not only be used in admixture with spreaders and the like surface active agents for agricultural purposes to expect the enhancement and accuracy in herbicidal effects thereof, but also be used in admixture with such agricultural chemicals as microbicides, insecticides and other herbicide or with fertilizers.

Procedures for formulating the present herbicidal compositions are set forth below with reference to blending examples.

BLENDING EXAMPLE 1

25 Parts by weight of 1,5-dimethyl-3-(m-chlorophenyl)-hydantoin, 5 parts by weight of a polyoxyethylene ester type surface active agent and 70 parts by weight of talc were sufficiently purverized and mixed together to obtain a wettable powder.

BLENDING EXAMPLE 2

30 Parts by weight of 1,5-dimethyl-3-(m-methylphenyl)-hydantoin, 20 parts by weight of a polyethylene glycol ether type surface active agent and 50 parts by weight of cyclohexanone were sufficiently mixed together to obtain an emulsifiable concentrate.

BLENDING EXAMPLE 3

5 Parts by weight of 1-ethyl-5-methyl-3-phenylhydantoin, 41 parts by weight of bentonite, 50 parts by weight of clay and 4 parts by weight of lignosulfonic acid salt were sufficiently pulverized and mixed together. The resulting mixture was thoroughly kneaded with water, and then granulated and dried to obtain a granule.

BLENDING EXAMPLE 4

8 Parts by weight of 1,5-diethyl-3-(p-chlorophenyl)-hydantoin and 92 parts by weight of clay were sufficiently pulverized and mixed together to obtain a dust.

The present invention is illustrated in further detail below with reference to examples, which are presented for purpose of illustration and are not intended to limit the scope of the invention.

EXAMPLE 1

A mixture comprising 40 ml. of toluene, 0.05 mole of N-methyl-N-($\alpha$-cyanoethyl)amine and 0.05 mole of 3-chlorophenyl isocyanate was heated at 80° – 100°C. for 2 hours. Thereafter, the temperature was lowered to below 80°C., and the mixture was charged with 15 ml. of a 20 percent aqueous hydrochloric acid solution and then refluxed for 2 hours with vigorous stirring. After cooling, the toluene layer was separated, and washed 2 times with water and then dried with anhydrous sodium sulfate. Subsequently, the toluene was removed under reduced pressure to obtain desired, 1,5-dimethyl-3-(m-chlorophenyl)hydantoin. Recrystallization from methanol gave a purified product, yield 87 percent, m.p. 103.5° – 105.5°C.

Elementary analysis:

| | C(%) | H(%) | N(%) | Cl(%) |
|---|---|---|---|---|
| Calculated (for $C_{11}H_{11}N_2ClO_2$) | 55.35 | 4.56 | 11.74 | 14.86 |
| Found | 55.31 | 4.72 | 11.68 | 14.67 |

The phenylisocyanates and amines shown in Table 1 were treated in the similar manner as in Example 1. The results obtained were as shown in Table 1.

Table 1

| Phenylisocyanates used | Amines used | 3-Phenylhydantoins obtained |
|---|---|---|
| | | Chemical formula |
| 4-Methylphenyl isocyanate | N-Methyl-N-($\alpha$-cyanoethyl)amine | ![structure] $C_{12}H_{13}N_2O_2$ |

Table 1 — Continued

| Phenylisocyanates used | Amines used | 3-Phenylhydantoins obtained |
|---|---|---|
| | | Chemical formula |
| 4-Nitrophenyl isocyanate | " | $NO_2-\text{C}_6\text{H}_4-N\overset{O}{\underset{O}{\diagdown}}\text{N}-CH_3, CH_3$ <br> $C_{11}H_{11}N_3O_4$ |

| 3-Phenylhydantoins obtained | | | | | | |
|---|---|---|---|---|---|---|
| m.p. (°C.) | Yield (%) | Elementary analysis | | | | |
| | | | C(%) | H(%) | N(%) | Cl(%) |
| 83.0 to 84.5 | 85 | Cal'd | 66.34 | 6.03 | 12.90 | – |
| | | Found | 66.05 | 6.13 | 12.67 | – |
| 158.5 to 160.5 | 76 | Cal'd | 53.01 | 4.45 | 16.86 | – |
| | | Found | 52.76 | 4.34 | 16.73 | – |

| Phenylisocyanates used | Amines used | 3-Phenylhydantoins obtained |
|---|---|---|
| 3-Fluorophenyl isocyanate | N-Methyl-N-(α-ethoxycarbonylethyl)amine | $F-\text{C}_6\text{H}_4-N\overset{O}{\diagdown}N-CH_3, CH_3$ <br> $C_{11}H_{11}N_2FO_2$ |
| 3,4-Dimethylphenyl isocyanate | " | $(CH_3)_2\text{C}_6\text{H}_3-N\overset{O}{\diagdown}N-CH_3, CH_3$ <br> $C_{13}H_{16}N_2O_2$ |
| 4-Methoxyphenyl isocyanate | N-Methyl-N-(α-carboxyethyl)amine | $CH_3O-\text{C}_6\text{H}_4-N\overset{O}{\diagdown}N-CH_3, CH_3$ <br> $C_{12}H_{14}N_2O_3$ |

Table I — Continued

| | | | | | | F | |
|---|---|---|---|---|---|---|---|
| 119.0 to 120.5 | 91 | Cal'd | 59.44 | 5.00 | 12.61 | 8.55 | |
| | | Found | 59.43 | 5.03 | 12.51 | 8.57 | |
| 136.0 to 137.0 | 86 | Cal'd | 67.21 | 6.96 | 12.06 | - | |
| | | Found | 67.08 | 7.04 | 12.02 | - | |
| 146.5 to 147.5 | 77 | Cal'd | 61.52 | 6.04 | 11.96 | - | |
| | | Found | 61.39 | 6.21 | 11.87 | - | |

| | | |
|---|---|---|
| 3-Chlorophenyl isocyanate | N-Methyl-N-(α-cyano-n-propyl)amine | $C_{12}H_{13}N_2ClO_2$ |
| " | N-Methyl-N-(α-cyano-n-hexyl)amine | $C_{15}H_{19}N_2ClO_2$ |
| " | N-Ethyl-N-(α-cyano-n-propyl)amine | $C_{13}H_{15}N_2ClO_2$ |

| | | | | | | |
|---|---|---|---|---|---|---|
| 110.5 to 113.0 | 92 | Cal'd | 57.03 | 5.19 | 11.09 | 14.03 |
| | | Found | 56.96 | 5.05 | 11.05 | 13.78 |
| 84.5 to 85.5 | 84 | Cal'd | 61.12 | 6.50 | 9.50 | 12.03 |
| | | Found | 61.18 | 6.45 | 9.65 | 11.89 |
| 79.0 to 80.5 | 89 | Cal'd | 58.54 | 5.67 | 10.50 | 13.29 |
| | | Found | 58.77 | 5.67 | 10.64 | 13.21 |

Table 1—Continued

| | | |
|---|---|---|
| 3-Chlorophenyl isocyanate | N-Allyl-N-(α-cyanoethyl)amine | 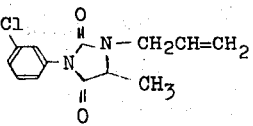<br>$C_{13}H_{13}N_2ClO_2$ |
| 4-Chlorophenyl isocyanate | N-Methyl-N-(α-cyano-n-butyl)amine | 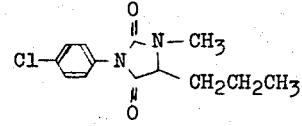<br>$C_{13}H_{15}N_2ClO_2$ |
| " | N-Ethyl-N-(α-cyanoethyl)amine | 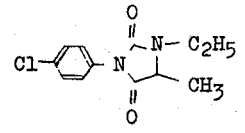<br>$C_{12}H_{13}N_2ClO_2$ |

| | | | | | | |
|---|---|---|---|---|---|---|
| 58.0 to 60.0 | 72 | Cal'd | 58.98 | 4.96 | 10.58 | 13.39 |
| | | Found | 58.74 | 5.09 | 10.55 | 13.27 |
| 136.0 to 137.0 | 85 | Cal'd | 58.54 | 5.67 | 10.50 | 13.29 |
| | | Found | 58.62 | 5.69 | 10.55 | 13.39 |
| 97.5 to 99.5 | 85 | Cal'd | 57.03 | 5.19 | 11.09 | 14.03 |
| | | Found | 57.30 | 5.08 | 11.31 | 14.06 |

| | | |
|---|---|---|
| 3-Chlorophenyl isocyanate | N-n-Butyl-N-(α-cyanoethyl)amine | 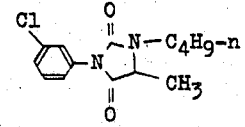<br>$C_{14}H_{17}N_2ClO_2$ |
| " | N-Benzyl-N-(α-cyanoethyl)amine | 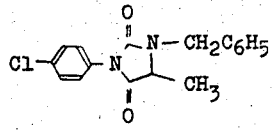<br>$C_{17}H_{15}N_2ClO_2$ |
| 3-Trifluoromethyl-4-methoxyphenyl isocyanate | N-Methyl-N-(α-carboxyethyl)amine | 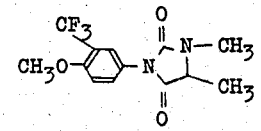<br>$C_{13}H_{13}N_2F_3O_3$ |

Table 1 — Continued

| | | | | | | |
|---|---|---|---|---|---|---|
| 48.5 to 50.0 | 83 | Cal'd | 59.89 | 6.10 | 9.98 | 12.63 |
| | | Found | 59.76 | 5.97 | 9.79 | 12.40 |
| 122.0 to 124.0 | 69 | Cal'd | 64.86 | 4.81 | 8.90 | 11.26 |
| | | Found | 65.15 | 4.66 | 9.06 | 11.10 |
| 102.0 to 105.0 | 79 | Cal'd | 51.66 | 4.34 | 9.27 | - |
| | | Found | 51.53 | 4.53 | 9.17 | - |

EXAMPLE 2

To a mixture comprising 40 ml. of toluene, 0.05 mole of 2-chloroaniline and 0.06 mole of pyridine, 0.05 mole of N-methyl-N($\alpha$-cyanoethyl)carbamoyl chloride was added dropwise with stirring. During the dropping, the temperature was kept at 10° – 15°C. and then elevated to 80° – 100°C., and the stirring was continued for 2 hours. Subsequently, the temperature was lowered to 80°C., and the mixture was charged with 15 ml. of a 20 percent aqueous hydrochloric acid solution and then refluxed for 2 hours. After cooling, the toluene layer was separated, washed 2 times with water and then dried with anhydrous sodium sulfate. Thereafter, the toluene was removed under reduced pressure, whereby desired 1,5-dimethyl-3-(o-chlorophenyl)hydantoin was obtained at a high purity and in a high yield. Recrystallization from methanol gave a purified product, yield 93 percent, m.p. 78.0° – 80.0°C.

Elementary analysis:

| | C(%) | H(%) | N(%) | Cl(%) |
|---|---|---|---|---|
| Calculated | 55.35 | 4.65 | 11.74 | 14.86 |
| Found | 55.44 | 4.59 | 11.82 | 15.08 |

The anilines and carbamoyl chlorides shown in Table 2 were treated in the similar manner as in Example 2. The results obtained were as set forth in Table 2.

Table 2

| Anilines used | Carbamoyl chloride used | 3-Phenylhydantoins obtained |
|---|---|---|
| | | Chemical formula |
| 4-Chloroaniline | N-Methyl-N-($\alpha$-cyanoethyl) carbamoyl chloride | 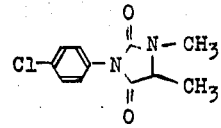 $C_{11}H_{11}N_2ClO_2$ |
| 4-Bromoaniline | N-Methyl-N-($\alpha$-ethoxy-carbonylethyl) carbamoyl chloride | 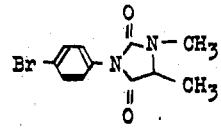 $C_{11}H_{11}N_2BrO_2$ |

Table 2 — Continued
| 3-Phenylhydantoins obtained | | | | | |
|---|---|---|---|---|---|
| m.p. (°C.) | Yield (%) | Elementary analysis | | | |
| | | | C(%) | H(%) | N(%) | Cl(%) |
| 148.0 to 149.5 | 88 | Cal'd | 55.35 | 4.65 | 11.74 | 14.86 |
| | | Found | 55.31 | 4.72 | 11.68 | 14.67 |
| 164.5 to 166.0 | 89 | Cal'd | 46.66 | 3.92 | 9.90 | - |
| | | Found | 46.90 | 3.78 | 10.05 | - |
| | | |
|---|---|---|
| 3-Trifluoromethyl aniline | N-Methyl-N-(α-cyanoethyl) carbamoyl chloride | 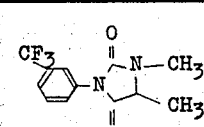 $C_{12}H_{11}N_2F_3O_2$ |
| 4-Ethoxycarbonyl aniline | " | 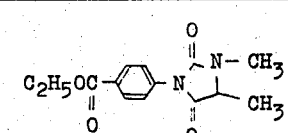 $C_{14}H_{16}N_2O_4$ |
| 3,4-Dichloro- aniline | " | 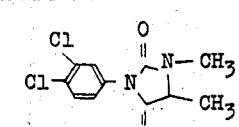 $C_{11}H_{10}N_2Cl_2O_2$ |
| m.p. (°C.) | Yield (%) | | C(%) | H(%) | N(%) | Cl(%) |
|---|---|---|---|---|---|---|
| 122.0 to 123.5 | 90 | Cal'd | 52.94 | 4.08 | 10.29 | - |
| | | Found | 52.61 | 4.08 | 10.07 | - |
| 125.5 to 127.0 | 83 | Cal'd | 60.85 | 3.85 | 10.14 | - |
| | | Found | 60.67 | 3.68 | 10.47 | - |
| 160.5 to 162.5 | 86 | Cal'd | 48.37 | 3.70 | 10.26 | 25.96 |
| | | Found | 48.37 | 3.60 | 10.27 | 25.94 |

Table 2 – Continued

| Starting aniline | Carbamoyl chloride | Product structure |
|---|---|---|
| 4-Methoxyaniline | N-Methyl-N-(α-ethoxycarbonylethyl)carbamoyl chloride | CH₃O–C₆H₄–N(CO)N(CH₃)–CH(CH₃)(CO)  $C_{12}H_{14}N_2O_3$ |
| 3-Chloroaniline | N-Methyl-N-(α-cyano-n-butyl)carbamoyl chloride | 3-Cl-C₆H₄–N(CO)N(CH₃)–CH(CH₂CH₂CH₃)(CO)  $C_{13}H_{15}N_2ClO_2$ |
| " | N-Ethyl-N-(α-cyano-n-propyl)carbamoyl chloride | 3-Cl-C₆H₄–N(CO)N(C₂H₅)–CH(C₂H₅)(CO)  $C_{13}H_{15}N_2ClO_2$ |

| m.p. (°C) | Yield (%) | | C | H | N | Cl |
|---|---|---|---|---|---|---|
| 146.5 to 147.5 | 77 | Cal'd | 61.52 | 6.04 | 11.96 | – |
| | | Found | 61.19 | 6.21 | 11.87 | – |
| 122.0 to 123.0 | 90 | Cal'd | 58.54 | 5.67 | 10.50 | 13.29 |
| | | Found | 58.29 | 5.50 | 10.38 | 13.25 |
| 79.0 to 80.5 | 85 | Cal'd | 58.54 | 5.67 | 10.50 | 13.29 |
| | | Found | 58.77 | 5.67 | 10.64 | 13.21 |

| Starting aniline | Carbamoyl chloride | Product structure |
|---|---|---|
| 3-Chloroaniline | N-Phenyl-N-(α-cyanoethyl)carbamoyl chloride | 3-Cl-C₆H₄–N(CO)N(C₆H₅)–CH(CH₃)(CO)  $C_{16}H_{13}N_2ClO_2$ |
| 4-Chloroaniline | N-Allyl-N-(α-cyanoethyl)carbamoyl chloride | 4-Cl-C₆H₄–N(CO)N(CH₂CH=CH₂)–CH(CH₃)(CO)  $C_{13}H_{13}N_2ClO_2$ |

Table 2—Continued

| | | | | | | |
|---|---|---|---|---|---|---|
| 109.5 to 111.5 | 60 | Cal'd | 63.90 | 4.36 | 9.32 | 11.79 |
| | | Found | 63.90 | 4.27 | 9.32 | 11.79 |
| 99.0 to 100.5 | 74 | Cal'd | 58.98 | 4.96 | 10.58 | 13.39 |
| | | Found | 58.95 | 4.81 | 10.55 | 13.18 |

EXAMPLE 3

Seeds of barnyardgrass and crabgrass as typical grass family plants and seeds of radish and pigweed as typical broad-leaved plants were individually sowed in unglazed flowerpots of 9 cm. in diameter. After covering the seeds with soil, each test compound in such amount as shown in Table 3 was applied and, on the 20th day after the application, the herbicidal effects of individual compounds were observed. The results obtained were as set forth in Table 3. Evaluations of the herbicidal effects were represented by the figures from O (non-phytotoxicity) to 5 (the plants were completely killed). All the test compounds were formulated into wettable powders according to the aforesaid Blending Example 1 and applied after dilution with water.

Table 3

| Name of compound | Amount applied (g/a) | Herbicidal effects on | | | |
|---|---|---|---|---|---|
| | | Barnyard grass | Crab grass | Radish | Pigweed sp. |
| (3) | 25 | 5 | 5 | 5 | 5 |
| | 12.5 | 2 | 4 | 5 | 5 |
| (4) | 25 | 5 | 5 | 5 | 5 |
| | 12.5 | 3 | 4 | 5 | 5 |
| (5) | 50 | 4 | 5 | 5 | 5 |
| | 25 | 2 | 4 | 4 | 5 |
| (7) | 50 | 3 | 4 | 4 | 5 |
| | 25 | 1 | 2 | 3 | 4 |
| (8) | 50 | 5 | 5 | 5 | 5 |
| | 25 | 3 | 4 | 5 | 5 |
| (9) | 50 | 5 | 5 | 5 | 5 |
| | 25 | 4 | 4 | 5 | 5 |
| (10) | 50 | 5 | 5 | 5 | 5 |
| | 25 | 5 | 5 | 5 | 5 |
| (11) | 25 | 5 | 5 | 5 | 5 |
| | 12.5 | 3 | 4 | 5 | 5 |
| (13) | 25 | 5 | 5 | 5 | 5 |
| | 12.5 | 2 | 4 | 5 | 5 |
| (14) | 100 | 3 | 4 | 4 | 5 |
| | 50 | 2 | 2 | 3 | 5 |
| (19) | 100 | 2 | 3 | 5 | 5 |
| | 50 | 1 | 2 | 3 | 5 |
| (22) | 50 | 5 | 5 | 5 | 5 |
| | 25 | 4 | 5 | 5 | 5 |
| (23) | 50 | 5 | 5 | 5 | 5 |
| | 25 | 5 | 5 | 5 | 5 |
| (24) | 25 | 5 | 5 | 5 | 5 |
| | 12.5 | 4 | 5 | 5 | 5 |
| (27) | 100 | 2 | 2 | 3 | 4 |
| | 50 | 1 | 1 | 2 | 3 |
| (28) | 100 | 3 | 4 | 5 | 5 |
| | 50 | 1 | 3 | 5 | 5 |

Table 3-Continued

| Name of compound | Amount applied (g/a) | Herbicidal effects on | | | |
|---|---|---|---|---|---|
| | | Barnyard grass | Crab grass | Radish | Pigweed sp. |
| (34) | 200 | 3 | 4 | 5 | 5 |
| | 100 | 1 | 3 | 4 | 5 |
| (36) | 50 | 5 | 5 | 5 | 5 |
| | 25 | 3 | 4 | 5 | 5 |
| (38) | 100 | 3 | 4 | 5 | 5 |
| | 50 | 1 | 3 | 5 | 5 |

What is claimed is:

1. A hydantoin derivative having the formula

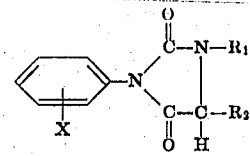

wherein X is nitro, cyano, lower alkoxy or lower alkoxycarbonyl, and $R_1$ and $R_2$ each are lower alkyl.

2. The compound of claim 1, represented by the formula,

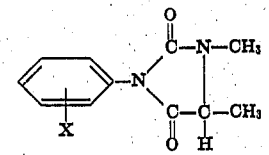

wherein X is as defined in claim 1.

3. A compound of the formula,

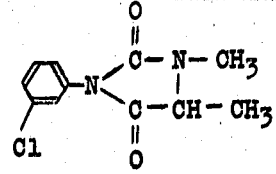

4. A compound of the formula,

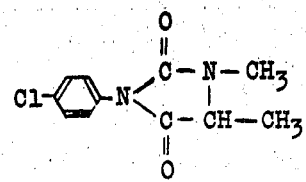

* * * * *